United States Patent [19]

Hensley, Jr. et al.

[11] 3,763,035

[45] Oct. 2, 1973

[54] REFORMING WITH RHENIUM-PROMOTED CHROMIA CATALYSTS

[75] Inventors: Albert L. Hensley, Jr., Munster; Thomas D. Nevitt, Valparaiso; John A. Mahoney, Griffith, all of Ind.

[73] Assignee: Standard Oil Company, Chicago, Ill.

[22] Filed: Aug. 25, 1970

[21] Appl. No.: 66,796

[52] U.S. Cl. ................................ 208/136, 252/465
[51] Int. Cl. ....................... C10g 37/02, B01j 11/06
[58] Field of Search................... 252/463, 465, 467; 208/136, 138; 260/673.5, 673

[56] References Cited
UNITED STATES PATENTS

| | | | |
|---|---|---|---|
| 3,179,602 | 4/1965 | Gremillion | 252/465 |
| 3,114,697 | 12/1963 | Bourne | 208/136 |
| 3,033,777 | 5/1962 | Moy | 208/79 |
| 3,449,237 | 6/1969 | Jacobson | 208/138 |
| 3,556,985 | 1/1971 | McCoy | 208/65 |
| 3,374,281 | 3/1968 | Csicsery | 260/673 |
| 3,649,566 | 3/1972 | Hayes et al. | 252/475 X |

Primary Examiner—Daniel E. Wyman
Assistant Examiner—W. J. Shine
Attorney—Arthur G. Gilkes, William T. McClain and James L. Wilson

[57] ABSTRACT

The catalyst comprises a small amount of rhenium and the oxides of chromium on a catalytically active alumina. The catalyst may be promoted by an oxide of an alkali metal, an oxide of an alkaline earth metal, or mixtures thereof. The catalyst is very efficient for the dehydrocyclization of paraffins and may be used in a process for reforming a petroleum hydrocarbon feedstock containing a substantial amount of paraffins, which process comprises contacting the hydrocarbon feedstock in a reforming reaction zone under reforming conditions and in the presence of hydrogen with the catalyst of the present invention.

12 Claims, 2 Drawing Figures

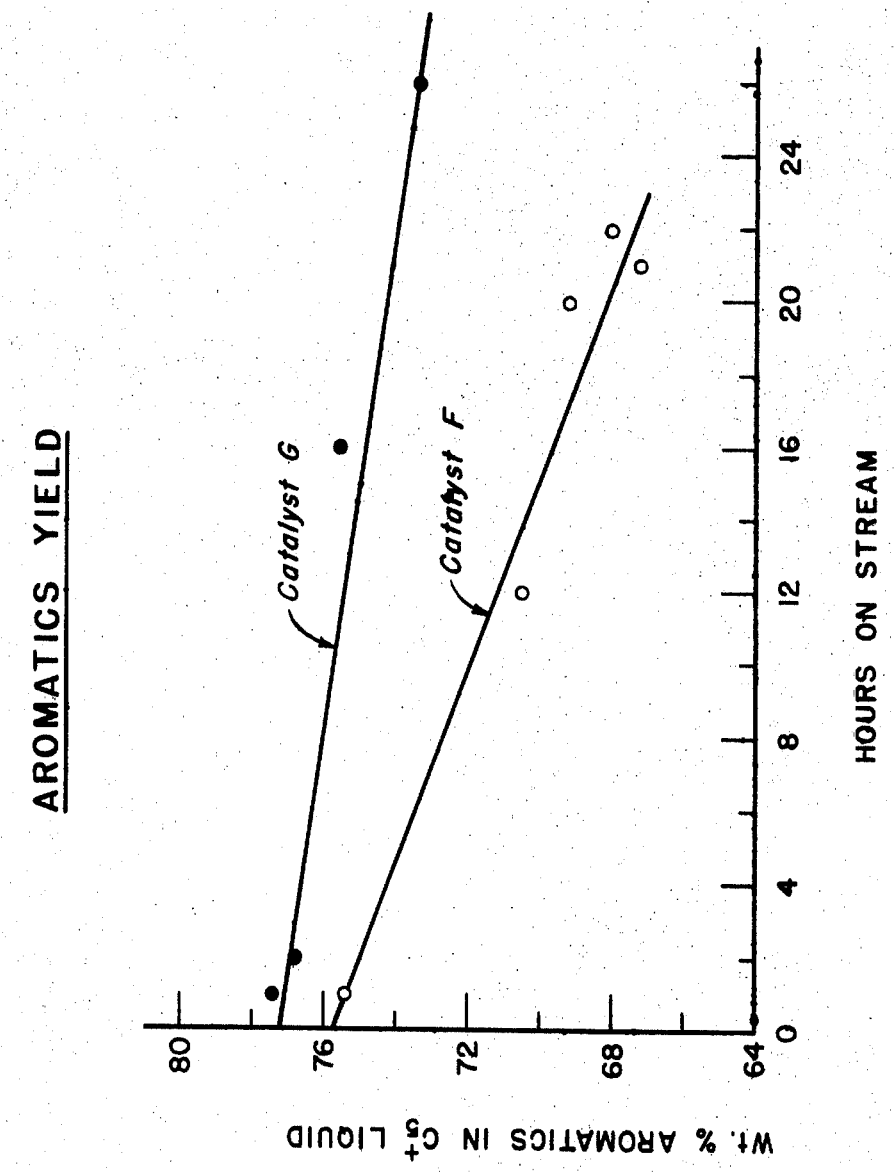

3,763,035

REFORMING WITH RHENIUM-PROMOTED CHROMIA CATALYSTS

BACKGROUND OF THE INVENTION

One of the important petroleum refining processes that are employed to provide high-octane-number hydrocarbon blending components for gasoline is the reforming process. In the typical reforming process, aromatics are produced by means of (1) the dehydrogenation of six-carbonring naphthenes, (2) the isomerization of five-carbon-member rings to six-carbon-member rings, and the subsequent dehydrogenation of the six-carbon-member rings, and (3) the dehydrocyclization of paraffinic hydrocarbons to aromatics.

Petroleum naphthas and gasoline-boiling-range hydrocarbons are converted in the typical reforming process in the presence of various catalysts. Typical of these catalysts are chromium-oxides-on-alumina catalysts, molybena-on-alumina catalysts, and platinum-halogen-on-alumina catalysts. Today, the catalysts that are most often employed in the reforming process by the petroleum refining industry are the platinum-halogen-on-alumina catalysts.

The prior art suggests that (1) the chromia catalysts, i.e., the chromium-oxides-on-alumina catalysts, possess low activity for isomerization and low activity for the dehydrocyclization of five-carbon-member-ring naphthenes to aromatics; (2) the rate of dehydrogenation of naphthenes to aromatics obtained with chromia catalysts is much lower than that observed with platinum catalysts; and (3) the chromia catalysts must be used at low pressures where coke formation rapidly deactivates the catalysts. Chromia catalysts, however, convert the five-carbon-member-ring naphthenes to coke, as well as to aromatics. The chromia catalysts are more selective in converting paraffins to aromatics than are the platinum catalysts. It has been found that chromia-on-alumina catalysts that are promoted with a member selected from the group consisting of an alkali metal, an alkaline earth metal, an oxide thereof, or mixtures thereof, are very good catalysts for converting paraffins to aromatics.

Surprisingly, it has now been found that a chromia-on-alumina catalyst which is promoted with a small amount of rhenium has provided activity and selectivity maintenance that are superior to those furnished by prior-art chromia-on-alumina catalysts.

SUMMARY OF THE INVENTION

Broadly, according to the present invention, there is provided an improved catalytic composition for the dehydrocyclization of paraffins, which catalytic composition comprises the oxides of chromium and a small amount of rhenium on a catalytically active alumina. This catalytic composition may be promoted by a member selected from the group consisting of (1) an oxide of an alkali metal, (2) an oxide of an alkaline earth metal, and (3) mixtures thereof. The rhenium may be present in an amount within the range of about 0.1 weight percent to about 5.0 weight percent, based upon the total weight of the catalyst.

According to the present invention, there is also provided a process for reforming a petroleum hydrocarbon stream containing a substantial amount of paraffins, which process comprises contacting said hydrocarbon stream in a reforming reaction zone under reforming conditions and in the presence of hydrogen with the catalytic composition of the present invention.

BRIEF DESCRIPTION OF THE DRAWINGS

Two drawings accompany this application.

FIG. 2 presents a comparison of two catalysts when each is employed to convert a partially reformed naphtha.

DESCRIPTION AND PREFERRED EMBODIMENTS

Figure 1:
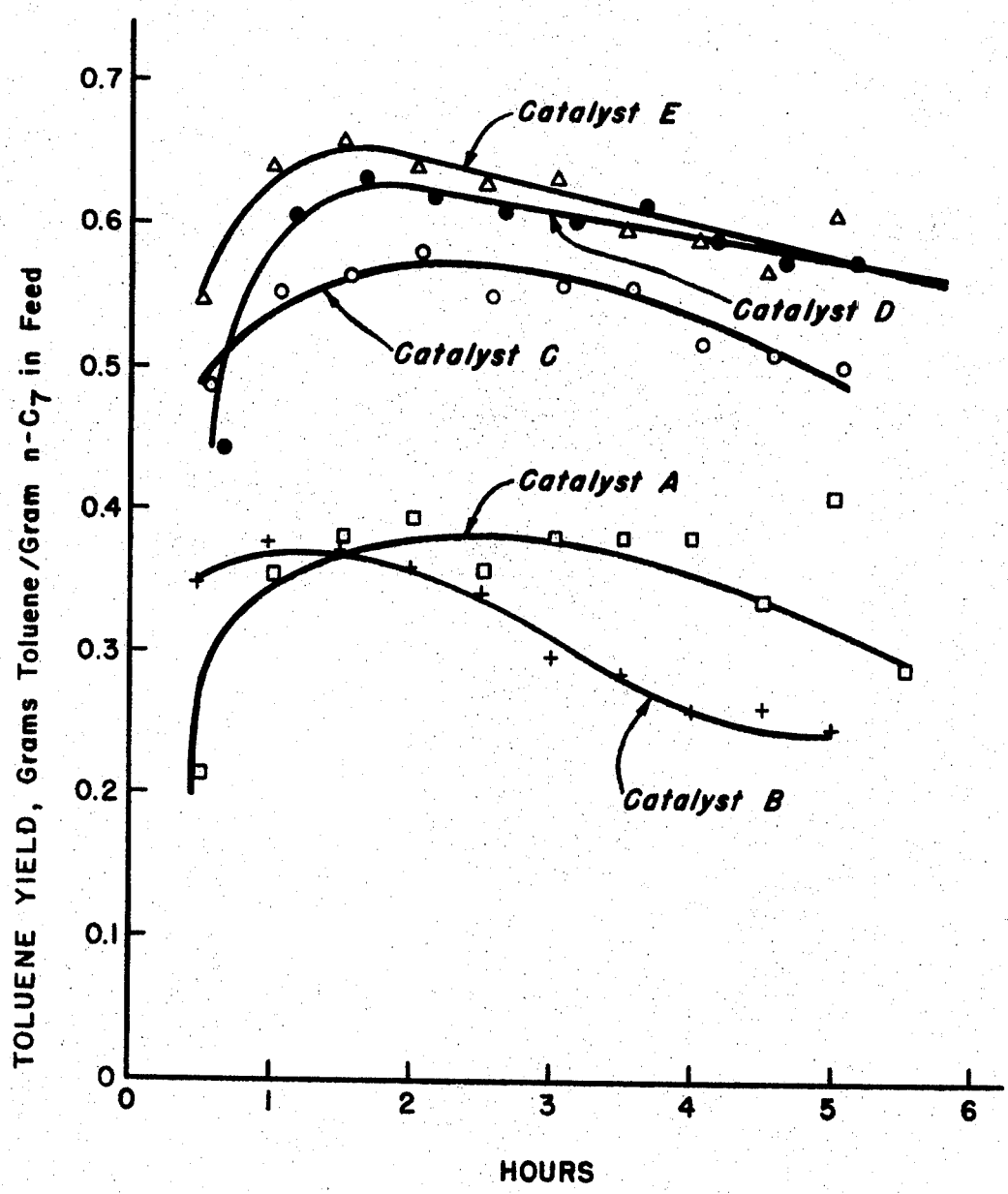
FIG. 1 presents a comparison of five different catalysts when employed to convert a feedstock composed of 90 weight percent normal heptane and 10 weight percent methylcyclopentane.

The highly mechanized society of today requires an increasing demand for very-high-octane-number motor fuels. Aromatics resulting from the reforming of petroleum hydrocarbon fractions comprise one of the sources of such high-octane numbers. If a suitable catalyst is employed, the paraffins in the feedstock may be dehydrocyclized to aromatics.

The catalytic composition of the present invention provides substantial production of aromatics from paraffins and, in addition, improves activity and selectivity maintenance. The catalytic composition of the present invention comprises the oxides of chromium, primarily $Cr_2O_3$, and a small amount of rhenium on a catalytically active alumina. This catalytic composition may be promoted by a member selected from the group consisting of (1) an oxide of an alkali metal, (2) an oxide of an alkaline earth metal, and (3) mixtures thereof. The oxides of chromium may be present in an amount within the the range of about 5 weight percent to about 25 weight percent, based upon the total weight of the catalyst; the rhenium may be present in an amount within the range of about 0.1 weight percent to about 5.0 weight percent; the alkaline component or member may be present in an amount within the range of about 0.1 to about 5.0 weight percent, calculated as the oxide and based upon the total weight of the catalyst.

The alumina that is employed as a support material in the catalyst of the present invention is a catalytically active alumina, e.g., eta-alumina or gamma-alumina. The alumina should have an average pore diameter of at least 45 Angstrom units (A) and a surface area within the range of about 100 square meters per gram to about 800 square meters per gram, or more.

The alumina which is used in the support of the catalytic composition of the present invention may be an alumina which has large pore diameters. The average pore diameter of such a large-pore diameter alumina should be within the range of about 70 A to about 200 A, suitably within the range of about 125 A to about 180 A, and preferably within the range of about 135 A to about 160 A. The surface area of such large-pore diameter alumina will fall within the range of about 150 square meters per gram to about 500 square meters per gram, suitably within the range of about 200 square meters per gram to about 350 square meters per gram.

Suitable aluminas can be purchased from manufacturers of catalysts. For example, NALCO 471 aluminas are available from the NALCO Chemical Company. These aluminas can be obtained with pore volumes from as low as 0.54 cubic centimeters per gram to as high as 2.36 cubic centimeters per gram and a corresponding average pore diameter within the range of about 72 A to about 305 A. Therefore, those NALCO 471 aluminas which have the desired physical properties are suitable for use as the support of the catalytic composition of the present invention.

In addition, suitable aluminas can be obtained from the American Cyanamid Company. For example, a typical sample of American Cyanamid's Aero Extrudate 100, Sample No. 2234-2, was found to have an average pore diameter of 138 A and a surface area of 238 square meters per gram.

The catalytic composition of the present invention can be prepared in several ways. For example, the catalyst can be made by impregnating the catalytically active alumina with an aqueous solution of either chromium nitrate, ammonium chromate, chromic acid, or ammonium dichromate. The chromium-containing alumina support can then be impregnated with a suitable aqueous solution of a rhenium compound. On the other hand, the catalyst can be prepared through the formation of a chromia-alumina aerogel. Ethylene oxide is added to a solution of ammonium chloride, chromic chloride, and glycerol. The catalyst may also be prepared by impregnating the ignited carrier with an aqueous solution of chromium nitrate. Moreover, the catalyst may be prepared by co-precipitation employing solutions of chromic acetate and sodium aluminate. If the catalytic composition is to contain an alkaline promoter, this promoter compound or element may be added prior to co-gelling or co-precipitation of the chromia and the alumina. The rhenium may be introduced into the catalyst composite by impregnating the alumina containing the water components.

The process of the present invention is a process for reforming a petroleum hydrocarbon feedstock containing a substantial amount of paraffins, which process comprises contacting the hydrocarbon feedstock in a reforming reaction zone under reforming conditions and in the presence of hydrogen with the catalytic composition of the present invention. Typical operating conditions include: an average catalyst bed temperature within the range of about 900°F. to about 1,050°F, a hydrogen-to-hydrocarbon ratio within the range of about 500 standard cubic feet of hydrogen per barrel of hydrocarbons (SCFB) to about 10,000 SCFB, a liquid hourly space velocity (LHSV) within the range of about 0.1 to about 5.0 volumes of hydrocarbon per volume of catalyst, and a total pressure within the range of about 0 psig to about 100 psig. Preferred operating conditions include: an average catalyst bed temperature within the range of about 920°F. to about 1,000°F., a hydrogen-to-hydrocarbon ratio within the range of about 1,000 SCFB to about 5,000 SCFB, a LHSV within the range of about 0.2 to about 1.5 volumes of hydrocarbon per hour per volume of catalyst, and a total pressure within the range of about 20 psig to about 45 psig.

Typical petroleum hydrocarbon feedstocks that may be suitably reformed by employing the process of the present invention are full-boiling range naphthas, i.e., naphthas boiling between about 100°F. and about 350°F. Preferred feedstocks are those that contain a substantial amount of paraffins. Desirable feedstocks may contain paraffins in an amount within the range of about 5 volume percent to about 100 volume percent. The ratio of paraffins to five-carbon-member-ring naphthenes should be at least 6-to-1.

Unwanted products in the reforming of aliphatic hydrocarbons containing at least six carbon atoms per molecule are light hydrocarbon gases and coke. As the operation progresses, a substantial amount of coke accumulates on the surface of the catalyst, resulting in an increasingly rapid rate of catalyst deactivation. Consequently, the coke must be removed periodically from the catalyst surface. Such coke removal may be accomplished through a coke-burn treatment wherein the coke-containing catalyst is contacted with an oxygen-containing gas at selected temperatures. Typically, the gas will contain oxygen within the range of about 1.0 volume percent to about 21.0 volume percent. The concentration of oxygen in the gas should be maintained at a level which will not result in the production of temperatures that are in excess of 1,100°F., preferably in excess of 1,050°F.

Since the coke must be removed frequently from the catalyst surface, the catalytic composition must be capable of withstanding regeneration. The catalytic composition of the present invention is capable of being regenerated. The catalyst may be employed in a fixed bed or in a fluidized bed.

In the following example, a number of tests were made to show the superior performance of the catalytic composition and the reforming process employing that catalytic composition. The example and tests are presented for the purpose of illustration only and are not intended to limit the scope of the present invention.

EXAMPLE I

Each of the tests was made in a small automated flow test unit. The hydrocarbon feedstock was mixed with hydrogen-containing gas and introduced into a tubular reactor fabricated from one-half-inch Schedule 40 Hasteloy B pipe. This mixture was passed down through the 36-inch long reactor, first passing through a preheat zone before contacting the catalyst bed. The reactor contained 20 inches of preheat section at its top end. The preheat zone or preheat section of the reactor was packed with Heli-pak SS 3012 prepared by Podbielniak, Inc. The catalyst bed was about 6 inches in length. A traveling thermocouple was moved in a coaxial well along the length of the reactor, enabling one to measure the temperature along the length of the catalyst bed. The electrically heated reactor was operated as an isothermal reactor.

Once-through hydrogen was introduced into the test system and was mixed with the hydrocarbon feedstock prior to its introduction into the reactor. The rate of hydrogen flow was controlled automatically by a differential pressure cell and was measured by a wet test meter and a printing totalizer. Off-gas from the test unit was measured by means of a wet test meter.

The liquid hydrocarbon feed was pumped by means of a Ruska pump. The product was collected in a combination separator-receiver, which was cooled by an ice-water mixture. Every half hour, a liquid sample was obtained from the receiver and a reading was obtained from the wet test meter. The liquid product sample was analyzed in a Beckman GC-5 gas chromatograph.

The hydrocarbon feedstock used in these tests was a blend of pure compounds. The blend was composed of 90 weight percent Research Grade normal-heptane and 10 weight percent pure grade methylcyclopentane. Both of these pure compounds were obtained from the Phillips Petroleum Company.

Five catalysts were tested in the above-described bench-scale test unit. The catalysts are hereinafter identified as Catalysts A, B, C, D, and E.

A catalyst was prepared to contain 10.2 percent (by weight) $Cr_2O_3$, 3.3 percent $K_2O$, and 86.5 percent alumina. Its preparation was as follows: a solution was prepared by dissolving 36.0 grams of $K_2Cr_2O_7$ and 21.75 grams of $CrO_3$ in 250 ml in warm distilled water. A 30 ml portion of concentrated ammonium hydroxide solution was added to adjust the pH of the solution to a value between about 5.0 and about 7.0. This aqueous solution was used to impregnate 300 grams of American Cyanamid Aero 100 alumina. The alumina was present as one-sixteenth-inch extrudates. The impregnated alumina was dried in static air for at least 16 hours at room temperature. The dried material was then calcined in static air for 2 hours at a temperature of about 538°C. (1,000°F.). This catalyst will hereinafter be identified as Catalyst A.

A catalyst was prepared to contain 1 weight percent rhenium on alumina. A solution was prepared by dissolving 1.30 grams of $Re_2O_7$ (99.995 weight percent pure) in 100 ml of distilled water. The impregnated alumina was then dried in static air at room temperature for at least 16 hours and calcined for 2 hours in static air at 400°C. (752°F.). This catalyst will hereinafter be identified as Catalyst B.

A catalyst was prepared to contain 0.2 weight percent rhenium, 2.5 weight percent $K_2O$, 10.1 weight percent $Cr_2O_3$, and 87.2 weight percent alumina. A solution was first prepared by dissolving 8.0 grams of $K_2Cr_2O_7$ and 10.0 grams of $(NH_4)_2Cr_2O_7$ in 80 ml of warm distilled water. This solution was used to impregnate 88.0 grams of American Cyanamid Aero 100 alumina. The impregnated alumina was subsequently dried in static air at room temperature for a period of time of at least 16 hours. The dried material was then impregnated with a solution prepared by dissolving 0.26 gram of $Re_2O_7$ in 30 ml of distilled water at room temperature. The rhenium-containing alumina was then dried in static air at room temperature for at least 16 hours and was then calcined for 2 hours in static air at a temperature of about 450°C. (842°F.). This catalyst will hereinafter be identified as Catalyst C.

A catalyst was prepared to contain 0.5 weight percent rhenium, 2.0 weight percent $K_2O$, 10.0 weight percent $Cr_2O_3$, and 87.5 weight percent alumina. A solution was prepared by dissolving 11.0 grams of $(NH_4)_2Cr_2O_7$ and 6.5 grams of $K_2Cr_2O_7$ in sufficient warm distilled water to give 100 ml of solution. This solution was used to impregnate 88.0 grams of American Cyanamid Aero 100 alumina. The impregnated alumina was dried in static air at room temperature for a period of time of at least 16 hours. The dried material was then impregnated with a solution that had been prepared by dissolving 0.65 gram of $Re_2O_7$ in 30 ml of distilled water at room temperature. The rhenium-containing alumina was subsequently dried in static air for about 4 hours at a temperature of about 80°C. (176°F.) to about 90°C. (194°F.). The dried rhenium-containing alumina was calcined in static air for 2 hours at a temperature of about 450°C. (842°F.). This catalyst will hereinafter be identified as Catalyst D.

A catalyst was prepared to contain 0.9 weight percent rhenium, 2.2 weight percent $K_2O$, 11.9 weight percent $Cr_2O_3$, and 85.1 weight percent alumina. A solution was prepared by dissolving 8.0 grams of $K_2Cr_2O_3$ and 13.0 grams of $CrO_3$ in 80 ml of distilled water. This solution was used to impregnate 100 grams of American Cyanamid Aero 100 alumina. The impregnated material was dried in static air at room temperature for a period of time of at least 16 hours. The dried material was then impregnated with a solution prepared by dissolving 1.30 grams of $Re_2O_7$ in 30 ml of warm distilled water. The rhenium-containing material was dried in static air at room temperature for a period of time of at least 16 hours and was subsequently calcined in static air for two hours at a temperature of about 450°C. (842°F.). This catalyst will hereinafter be identified as Catalyst E.

Each of the above catalysts was tested in the above-described unit. In each case, the catalyst, which had been prepared in the form of one-sixteenth-inch extrudates, was ground to a fine particle size so that it would pass through a 14-mesh screen (U.S. Sieve), but would be retained upon a 40-mesh screen (U.S. Sieve). Each catalyst sample weighed 20 grams.

All the catalysts, with the exception of Catalyst B, occupied a volume of 35 cubic centimeters. The sample of Catalyst B occupied 38 cubic centimeters.

Each of the tests was conducted with a pressure of 30 psig, an average catalyst temperature within the range of 984°F. to 990°F., a LHSV within the range of 0.27 to 0.29, and a hydrogen-to-hydrocarbon ratio of about 2,000 SCFB.

The relevant test information from each of these five tests is summarized in Table I and FIG. 1. In FIG. 1, catalyst activity is expressed as the grams of toluene per gram of normal heptane in the feed. Table I shows the product distribution in the average liquid product composited from the first five hours of operation for each catalyst.

TABLE I.—TEST DATA SUMMARY

| Catalyst | Avg. cat. temperature, °F. | Average product distribution, weight percent in liquid | | | | | |
|---|---|---|---|---|---|---|---|
| | | LHSV | MCP | Benzene | Toluene | Heptane | $C_1$-$C_6$'s |
| A | 990 | 0.29 | 3.4 | 8.2 | 52.4 | 24.5 | 11.5 |
| B | 989 | 0.27 | 1.9 | 12.1 | 42.1 | 26.4 | 17.5 |
| C | 990 | 0.29 | 3.7 | 8.2 | 66.2 | 15.3 | 6.6 |
| D | 990 | 0.29 | 3.6 | 8.2 | 72.3 | 10.4 | 5.5 |
| E | 984 | 0.29 | 3.4 | 7.7 | 72.8 | 11.4 | 4.7 |

The results from the tests show that the catalysts that contained chromia on alumina and were promoted by rhenium, that is Catalysts C, D, and E, have an improved initial activity and provide superior activity decline rates. The data indicate also that the rhenium promoted catalysts are more selective for the dehydrocyclization of normal-heptane and the isomerization and dehydrogenation of methylcyclopentane. It is believed that the improved selectivity should increase the production of the aromatics and the hydrogen yields, while at the same time reducing the yield of low-value hydrocarbons.

EXAMPLE II

Each of the following two tests were performed in a bench-scale test unit employing a reactor fabricated from three-eighths-inch I.D. stainless steel tubing. A one-eighth-inch O.D. co-axial thermowell extended along the length of the reactor. The catalyst bed in the reactor had a length of about 6 inches.

Catalyst F was prepared to contain 1.0 percent (by weight) $K_2O$ and 9.8% $Cr_2O_3$ and 89.2 percent alumina. One liter of a solution was prepared to contain 165 grams of $(NH_4)_2Cr_2O_7$ and 15.0 grams of $K_2(CO_3)$. This solution was used to impregnate 900 grams of American Cyanamid large-pore Aero 100 alumina. The impregnated material was then dried at room temperature for 24 hours in static air. A portion of this dried material was calcined at a temperature of 752°F. for two hours in static air. The calcined material was Catalyst F.

A catalyst was prepared to contain 0.5 percent rhenium. This material was prepared by impregnating 500 grams of Catalyst F with a rhenium-containing solution. This latter solution was prepared by introducing 4.65 grams of a solution containing 53 percent rhenium as $Re_2O_7$, in sufficient water to make 400 ml of solution. The impregnated material was dried in static air at room temperature and subsequently calcined in static air at a temperature of 752°F. for two hours. This catalyst will hereinafter be identified as Catalyst G.

Each of the above two catalysts was tested in the unit described hereinabove in Example II. In each case, the catalyst, which had been prepared in the form of one-sixteenth-inch extrudates, was ground to a fine particle size so that it would pass through a 20-mesh screen (U.S. Sieve), but would be retained upon a 35-mesh screen (U.S. Sieve). For each catalyst, a two-catalyst-bed system was employed. The catalyst beds were separated from one another by alumina balls. Bed No. 1 was 6 inches in length and Bed No. 2 was 6 inches in length. A reactor pressure of 30 psig and a liquid hourly space velocity of 0.5 volume of hydrocarbon per hour per volume of catalyst and a hydrogen flow rate of about 2,000 SCFB were employed in these tests. For Catalyst F, the average temperature of Catalyst Bed No. 1 was 979°F. while the average temperature of Catalyst Bed No. 2 was 989°F. For Catalyst G, the average temperature of Catalyst Bed No. 1 was 975°F. while the average temperature of Catalyst Bed No. 2 was 987°F. The hydro-carbon feedstock, Feed No. 1, was a partially reformed naphtha possessing the properties listed in Table II.

TABLE II

Properties of Feed No. 1

| | |
|---|---|
| Gravity °API | 52.2 |
| Unleaded Research Octane Number | 83.3 |
| Hydrocarbon Composition (PONA) | |
| Paraffins | 51.2 |
| Naphthenes | 4.6 |
| Aromatics | 44.2 |
| ASTM Distillation, °F. | |
| Initial | 108 |
| 10% | 182 |
| 30% | 230 |
| 50% | 255 |
| 70% | 277 |
| 90% | 310 |
| Final | 360 |

The performance of each catalyst is depicted in FIG. 2, wherein the activity of the catalyst is expressed as the weight percent aromatics in the liquid product. Catalyst F was tested for 22 hours while Catalyst G was tested for 26 hours. A composite sample obtained with Catalyst G was obtained for the period between the third hour and the 22nd hour of the test. For Catalyst F, the unleaded octane number of the liquid product was 97.8 and the $C_5+$ liquid product contained 68.8 volume % aromatics. For Catalyst G, the unleaded research octane number of the liquid product was 101.1 and the $C_5+$ liquid product contained 74.8 volume % aromatics. A composite sample of the product obtained with Catalyst F was obtained for the period between the third hour and 19th hour.

Product distributions obtained from these composite samples are presented in Table III.

TABLE III

| Component | Volume % on feed (For Catalyst F) | Volume % on feed (For Catalyst G) |
|---|---|---|
| $C_5$ | 7.51 | 6.68 |
| $C_6$ | 8.54 | 7.97 |
| $C_7$ | 6.80 | 5.14 |
| $C_8$ | 2.72 | 1.15 |
| Aromatics | 56.40 | 62.00 |
| Total | 81.97 | 82.94 |

Table III shows that the composite product sample for Catalyst G, i.e., the catalyst promoted with the rhenium, contained a larger concentration of aromatics than the composite sample for Catalyst F, i.e., the catalyst that did not contain any rhenium. Moreover, Catalyst G provided an unleaded research octane number that was greater than that obtained with Catalyst F.

FIG. 2 shows a higher initial aromatics concentration in the liquid product, as well as a smaller decline in aromatics concentration, for Catalyst G as the test progressed. The above data clearly demonstrate the superior performance of the catalyst promoted with the rhenium.

EXAMPLE III

An additional two tests were performed in the bench-scale test unit described in Example II. Catalyst G, as described hereinabove, was compared with a chloride-promoted platinum-rhenium reforming catalyst, hereinafter identified as Catalyst H. These two tests were conducted with a paraffinic naphtha feedstock.

Catalyst H was prepared by impregnating a commerically manufactured 0.8 percent (by weight) platinum reforming catalyst having a high reforming activity with an aqueous solution of rhenium heptaoxide. 50 grams of the platinum-containing reforming catalyst were impregnated with 50 ml. of a solution which contained 0.25 gram of rhenium as $Re_2O_7$. The water was evaporated under a heat lamp and the material was calcined subsequently for 2 hours in static air at a temperature of 750°F. The calcined material was the finished Catalyst H.

Each of the Catalysts G and H were prepared in the form of one-sixteenth-inch extrudates. Each catalyst was pulverized to pass through a 20-mesh screen (U.S. Sieve), but to be retained on a 35-mesh screen (U.S. Sieve). In each case, the catalyst bed was 6 inches in length.

Catalyst G, the chromia-rhenium catalyst, was tested at 30 psig and demonstrated satisfactory catalyst life. However, the test employing Catalyst H, the platinum-rhenium-chloride catalyst, was made at a reactor pressure of 60 psig, since such catalyst is deactivated too rapidly at 30 psig for useful results to be obtained. The feedstock that was employed was a naphtha having the properties presented in Table IV. This feedstock is hereinafter identified as Feed No. 2.

TABLE IV

Feed Properties

|  | Feed No. 2 | Feed No. 3 |
|---|---|---|
| Gravity °API | 60.0 | 56.0 |
| Unleaded Research Octane Number | | |
| Hydrocarbon Composition (PONA) | | |
| Paraffins and Olefins | 68.6 | 57.0 |
| Naphthenes | 19.3 | 3.2 |
| Aromatics | 12.1 | 39.8 |
| ASTM Distillation, °F. | | |
| Initial | 191 | 118 |
| 10% | 219 | 184 |
| 30% | 236 | 230 |
| 50% | 256 | 253 |
| 70% | 280 | 282 |
| 90% | 310 | 321 |
| Final | 366 | 408 |

For the test with Catalyst G, Feed No. 2 was partially reformed over a catalyst comprising 0.8 percent (by weight) platinum and 0.8 percent chloride on a catalytically active alumina at a LHSV of about 5 volumes of hydrocarbon per hour per volume of catalyst, a temperature of 850°F., and a pressure of 60 psig to reduce the concentration of 5-carbon-member-ring naphthenes to a suitable level. The properties of this partially reformed feedstock, hereinafter identified as Feed No. 3, are presented in Table IV. The total product from this partial reforming step was passed over Catalyst G at a LHSV of 0.5, a pressure of 30 psig, a hydrogen-to-hydrocarbon ratio of 2,000 SCFB, and an average catalyst bed temperature of 983°F. For the test with Catalyst H, Feed No. 2 was passed over Catalyst H at a liquid hourly space velocity of 1 volume of hydrocarbon per hour per volume of catalyst, a pressure of 60 psig, a hydrogen-to-hydrocarbon ratio of 2,000 SCFB, and an average catalyst bed temperature of 905°F. A composite liquid sample was obtained with each of the catalysts for the period between the 2nd hour and the 19th hour of the test. For Catalyst G the unleaded research octane number of the liquid product was 99.1 and the $C_5+$ liquid product contained 69.4 volume percent aromatics. For Catalyst H, the unleaded research octane number of the liquid product was 99.3 and the $C_5+$ liquid product contained 66.5 volume percent aromatics. Product distributions obtained from these two composite samples are provided in Table V.

TABLE V

Product Distributions

| Component | Volume % on feed For Catalyst G | Volume % on feed For Catalyst H |
|---|---|---|
| $C_5$ | 4.76 | 8.30 |
| $C_6$ | 7.22 | 8.03 |
| $C_7$ | 8.61 | 5.45 |
| $C_8$ | 3.00 | 2.77 |
| Aromatics | 54.58 | 49.61 |
| Total | 78.67 | 74.61 |

The above data show that Catalyst G, an embodiment of the catalyst of the present invention, produces both aromatics and total liquid product in greater quantities than those obtained through the use of Catalyst H at the same octane number level, when both catalysts are operated at low pressures to obtain maximum yields of aromatics from a given feedstock, the feed having been partially reformed to minimize $C_5$-carbon member naphthenes before being passed over the Catalyst G.

It is believed that the catalytic composition of the present invention provides improved conversion of feedstocks containing substantial amounts of paraffins. Such catalytic composition can be used to convert many low-octane refinery streams to products having much higher octane numbers in greater yields than can obtained by reforming similar petroleum hydrocarbon streams with conventional platinum-catalyst reforming methods. It is further believed that these catalysts will enable the refiner to produce increased amounts of hydrogen having a purity higher than the hydrogen obtained when reforming with platinum-containing catalysts.

What is claimed is:

1. A catalytic composition consisting essentially of the oxides of chromium and a small amount of rhenium on a catalytically active alumina, said rhenium being present in an amount within the range of about 0.1 weight percent to about 5.0 weight percent and said oxides of chromium being present in an amount within the range of about 5 weight percent to about 25 weight percent, based upon the total weight of said catalytic composition.

2. The catalytic composition of claim 1 wherein said catalytic composition also consists essentially of a member selected from the group consisting of (1) an oxide of alkali metal, (2) an oxide of an alkaline earth metal, and (3) mixtures thereof, said member being present in an amount within the range of about 0.1 weight percent to about 5.0 weight percent, calculated as the oxide and based upon the total weight of said catalytic composition.

3. A process for the reforming of a petroleum hydrocarbon feedstock containing from 5 to 100 volume percent paraffins, which process comprises contacting said hydrocarbon feedstock in a reforming reaction zone under reforming conditions and in the presence of hydrogen with the catalytic composition of claim 1, said reforming conditions comprising an average catalyst bed temperature within the range of about 900°F. to about 1,050°F., a hydrogen-to-hydrocarbon ratio within the range of about 500 SCFB to about 10,000 SCFB, a LHSV within the range of about 0.1 to about 5.0 volumes of hydrocarbon per hour per volume of catalyst, and a total pressure within the range of about 0 psig to about 100 psig.

4. The catalytic composition of claim 1 wherein said alumina is a large-pore diameter alumina, said alumina being characterized by an average pore diameter within the range of about 70 A to about 200 A and a surface area within the range of about 150 square meters per gram to about 500 square meters per gram.

5. A process for the reforming of a petroleum hydrocarbon feedstock containing from 5 to 100 volume percent paraffins, which process comprises contacting said hydrocarbon feedstock in a reforming reaction zone under reforming conditions and in the presence of hydrogen with the catalytic composition of claim 2, said reforming conditions comprising an average catalyst bed temperature within the range of about 900°F. to about 1,050°F., a hydrogen-to-hydrocarbon ratio within the range of about 500 SCFB to about 10,000 SCFB, a LHSV within the range of about 0.1 to about 5.0 volumes of hydrocarbon per hour per volume of catalyst, and a total pressure within the range of about 0 psig to about 100 psig.

6. The catalytic composition of claim 2 wherein said alumina is a large-pore diameter alumina, said alumina being characterized by an average pore diameter within the range of about 70 A to about 200 A and a surface area within the range of about 150 square meters per gram to about 500 square meters per gram.

7. The process of claim 3 wherein said reforming conditions comprise an average catalyst bed temperature within the range of about 920°F. to about 1,000°F., a hydrogen-to-hydrocarbon ratio within the range of about 1,000 SCFB to about 5,000 SCFB, a LHSV within the range of about 0.2 to about 1.5 volumes of hydrocarbon per hour per volume of catalyst, and a total pressure within the range of about 20 psig to about 45 psig.

8. A process for the reforming of a petroleum hydrocarbon feedstock containing from 5 to 100 volume percent paraffins, which process comprises contacting said hydrocarbon feedstock in a reforming reaction zone under reforming conditions and in the presence of hydrogen with the catalytic composition of claim 4, said reforming conditions comprising an average catalyst bed temperature within the range of about 900°F. to about 1,050°F., a hydrogen-to-hydrocarbon ratio within the range of about 500 SCFB to about 10,000 SCFB, a LHSV within the range of about 0.1 to about 5.0 volumes of hydrocarbon per hour per volume of catalyst, and a total pressure within the range of about 0 psig to about 100 psig.

9. The process of claim 5 wherein said reforming conditions comprise an average catalyst bed temperature within the range of about 920°F. to about 1,000°F., a hydrogen-to-hydrocarbon ratio within the range of about 1,000 SCFB to about 5,000 SCFB, a LHSV within the range of about 0.2 to about 1.5 volumes of hydrocarbon per hour per volume of catalyst, and a total pressure within the range of about 20 psig to about 45 psig.

10. A process for the reforming of a petroleum hydrocarbon feedstock containing from 5 to 100 volume percent paraffins, which process comprises contacting said hydrocarbon feedstock in a reforming reaction zone under reforming conditions and in the presence of hydrogen with the catalytic composition of claim 6, said reforming conditions comprising an average catalyst bed temperature within the range of about 900°F. to about 1,050°F., a hydrogen-to-hydrocarbon ratio within the range of about 500 SCFB to about 10,000 SCFB, a LHSV within the range of about 0.1 to about 5.0 volumes of hydrocarbon per hour per volume of catalyst, and a total pressure within the range of about 0 psig to about 100 psig.

11. The process of claim 8 wherein said reforming conditions comprise an average catalyst bed temperature within the range of about 920°F. to about 1,000°F., a hydrogen-to-hydrocarbon ratio within the range of about 1,000 SCFB to about 5,000 SCFB, a LHSV within the range of about 0.2 to about 1.5 volumes of hydrocarbon per hour per volume of catalyst, and a total pressure within the range of about 20 psig to about 45 psig.

12. The process of claim 10 wherein said reforming conditions comprise an average catalyst bed temperature within the range of about 920°F. to about 1,000°F., a hydrogen-to-hydrocarbon ratio within the range of about 1,000 SCFB to about 5,000 SCFB, a LHSV within the range of about 0.2 to about 1.5 volumes of hydrocarbon per hour per volume of catalyst, and a total pressure within the range of about 20 psig to about 45 psig.

* * * * *